United States Patent [19]
Uehara

[11] Patent Number: 5,838,401
[45] Date of Patent: Nov. 17, 1998

[54] IMPACT RESISTANT CRYSTAL APPARATUS

[75] Inventor: Makoto Uehara, Zama, Japan

[73] Assignee: Canon Kabushiki Kaisha, Tokyo, Japan

[21] Appl. No.: 816,998

[22] Filed: Mar. 14, 1997

[30] Foreign Application Priority Data

Mar. 15, 1996 [JP] Japan ................................ 8-059664

[51] Int. Cl.⁶ ........................ G02F 1/1333; G02F 1/1345
[52] U.S. Cl. ............................... 349/58; 349/60; 349/150
[58] Field of Search ................................ 349/58, 60, 150

[56] References Cited

U.S. PATENT DOCUMENTS

| | | | |
|---|---|---|---|
| 5,150,231 | 9/1992 | Iwamoto et al. | 349/60 |
| 5,400,160 | 3/1995 | Takahasi et al. | 349/60 |
| 5,583,681 | 12/1996 | Shioya et al. | 349/60 |
| 5,659,376 | 8/1997 | Uehara et al. | 349/58 |
| 5,710,607 | 1/1998 | Iwamoto et al. | 349/150 |

FOREIGN PATENT DOCUMENTS 3-118515  5/1991  Japan ...................... 349/58

*Primary Examiner*—William L. Sikes
*Assistant Examiner*—Toan Ton
*Attorney, Agent, or Firm*—Fitzpatrick, Cella, Harper & Scinto

[57] ABSTRACT

A liquid crystal apparatus includes a rectangular plate member, a frame-shaped support member disposed with a prescribed gap from and so as to surround the plate member, and a first elastic member disposed at the prescribed gap to connect the plate member and the support member to each other. The plate member is made free from connection to the support member by means of the first elastic member at corners of the plate member. The structure is effective for alleviating the warping of the liquid crystal panel causing liquid crystal alignment defects.

12 Claims, 4 Drawing Sheets

A-A SECTION (ORDINARY STATE)

(UNDER IMPACT)

IMPACT RESISTANT CRYSTAL APPARATUS

FIELD OF THE INVENTION AND RELATED ART

The present invention relates generally to a liquid crystal apparatus having an improved impact-resistance.

Hitherto, liquid crystal apparatus utilizing liquid crystals for displaying various data have been used in various fields.

FIG. 1 is a sectional view showing an example structure of such a liquid crystal apparatus using a liquid crystal, such as a nematic liquid crystal, a ferroelectric liquid crystal, etc.

Referring to FIG. 1, a liquid crystal apparatus 1 is provided with a liquid crystal panel P, which includes a pair of glass substrates 2 and 3 disposed substantially parallel to each other to leave a gap therebetween. Each of the glass substrates 2 and 3 has transparent electrodes (not shown) on their inner surfaces between. The gap between the substrates is filled with a liquid crystal. Polarizers 5 and 6 are applied to the outer surfaces of the glass substrates 2 and 3, respectively.

The transparent electrodes of the liquid crystal panel P are connected to a circuit board 9, e.g., via a flexible wiring member 7 carrying thereon a driver IC (not shown), and the circuit board 9 is connected to a control apparatus (not shown) so as to supply drive signals to the transparent electrodes, thereby driving the liquid crystal panel P.

Below the liquid crystal panel P, a backlight device B is disposed. The backlight device B includes fluorescent lamps 10, a reflection plate 11 on the backside of the lamps 10, and a diffusion plate 12 on a front side (the liquid crystal panel P side) of the lamps 10, so that light emitted from the lamps is reflected by the reflection plate 11 toward the front side and adjusted into a uniform luminance of planar light for illuminating the liquid crystal panel P from its backside, thereby displaying a picture on the liquid crystal panel through optical modulation by the liquid crystal at the respective pixels.

The liquid crystal panel P and the backlight device B are covered with a cover C1 comprising a metal and/or a resinous plate. The cover C1 is provided with an aperture C1a defining the display picture area of the liquid crystal apparatus. The liquid crystal plate P is attached to the cover C1 via a cushioning member 13 of rubber, etc., so as to close the aperture C1a. A cushioning member 15 is also disposed between the backlight device B and the liquid crystal panel P. As a result, an impact externally applied to the liquid crystal apparatus is reduced by the cushioning members 13 and 15 to be prevented from being directly applied to the liquid crystal panel P.

However, the above-mentioned structure of liquid crystal apparatus using such cushioning members 13 and 15 is insufficient for certain liquid crystal materials having a lower durability against a mechanical stress.

For this reason, a liquid crystal apparatus having an enhanced cushioning effect for a liquid crystal panel has been proposed.

FIG. 2 is a sectional view of a liquid crystal apparatus, for example, having a structure for providing an enhanced impact resistance.

Referring to FIG. 2, a liquid crystal apparatus 30 includes a liquid crystal panel (liquid crystal device) P and a cover (housing) C2 covering the liquid crystal plate P. To the cover C2 covering the liquid crystal panel P is attached a fixed supporting member (or support member) 31.

As shown in more detail in FIG. 3, the fixed supporting member 31 is disposed in a frame shape so as to surround the liquid crystal panel P, and a fixing plate (or plate member) 32 is disposed inside the fixed supporting member 31. In other words, the fixed supporting member 31 is disposed with a prescribed gap from the fixing plate 32 so as to surround the fixing plate 33. Further, at the gap between the fixed supporting member 31 and the fixing plate 32, an elastic member 33 is disposed along the whole periphery of the fixing plate 32 so as to fill the gap, whereby the fixed supporting plate 31 and the fixing plate 32 are connected to each other via the elastic member 33 of an elastic material.

On the other hand, the fixing plate 32 is provided with an aperture 32a, and the liquid crystal panel P is disposed above the fixing plate 32 so as to close the aperture 32a. The liquid crystal panel P and the fixing plate 32 are bonded to each other with an adhesive 35 applied on the fixing plate 32 so as to surround the aperture 32a. Similarly as described above, the liquid crystal panel P comprises a pair of glass plates 2 and 3 disposed substantially parallel to each other and having transparent electrodes thereon, and a liquid crystal (not shown) disposed between the substrates 2 and 3. A pair of polarizing films (polarizers) 5 and 6 are applied to the outer surfaces of the substrates 2 and 3 to provide the liquid crystal panel P.

The liquid crystal panel P is connected to a circuit board 9 via a flexible wiring member 7, and the circuit board 9 is fixed onto a rib 32b formed on an upper surface of a fixing plate 32.

Onto the lower surface of the fixing plate 32, a diffusion plate (diffusion means) 36 is affixed and therebelow a backlight device (light source) B is disposed by being affixed onto a fixed supporting member 31. The backlight device B may for example comprise one or more fluorescent lamps, and a light-guide member for guiding light from the fluorescent lamps to the side of the liquid crystal panel, so that the light from the backlight device B, after diffusion by a diffusion plate 36, is incident to and passed through the liquid crystal panel P to allow easy recognition of picture data on the liquid crystal panel P.

On an upper surface of the backlight device B, a sponge member 37 rich in elasticity is disposed so that the upper surface of the sponge member 37 contacts the fixing plate 32. The sponge member 37 is formed in a frame shape and is disposed so as to define an almost closed space A1 by the backlight device B, the diffusion plate 36, the fixing plate 32 and the sponge member 37.

The cover C2 is provided with the aperture C2a roughly defining the picture area of the liquid crystal display apparatus, and the aperture C2a is closed with a protective plate 38 attached to the cover C2 with an adhesive tape, etc. On the lower surface of the protective plate 38, a frame-shaped sponge-like cushioning member (second elastic member) is disposed so as to surround a picture display region on the liquid crystal plate P. The lower surface of the cushioning member 39 contacts the upper surface of the liquid crystal panel P so as to define an almost closed space A2 by the cushioning member 32, the protective plate 38 and the liquid crystal panel P.

In the liquid crystal display apparatus 30, the almost closed spaces A1 and A2 formed below and above the liquid crystal panel P exhibit a so-called air damper effect to alleviate a mechanical stress applied to the liquid crystal panel P due to an impact applied to the apparatus.

Incidentally, in case where such a liquid crystal display apparatus is subjected to a violent impact as by dropping during transportation as shown in FIGS. 4A and 4B, which are sectional views taken along a line A—A in FIG. 3, the fixing plate 32 and the liquid crystal panel P are warped and deformed into a shape of a bowl as shown in FIG. 4B, thus being liable to cause an alignment deterioration of the liquid crystal in the panel P. More specifically, under application of a violent impact, the fixing plate 32 and the liquid crystal panel P is caused to move vertically as a whole to some extent but, as the edge of the fixing plate 32 is affixed relatively strongly to the fixed supporting member 31 via the elastic member 33 along the entire periphery, the edge cannot be moved sufficiently. Therefore, larger movements are caused at the center of the fixing plate 32 and the center of the liquid crystal panel P due to the rigidity of the glass substrates constituting the liquid crystal panel P, whereby these members were warped and deformed into a shape of a bowl. Due to the deformation, the liquid crystal alignment deterioration in the liquid crystal panel is caused.

SUMMARY OF THE INVENTION

Accordingly, a principal object of the present invention is to provide a liquid crystal apparatus capable of an improved impact relaxation effect so as to alleviate liquid crystal alignment deterioration in a liquid crystal panel included therein.

According to the present invention, there is provided a liquid crystal apparatus, comprising:

a rectangular plate member, a frame-shaped support member disposed with a prescribed gap from and so as to surround the plate member, and a first elastic member disposed at the prescribed gap to connect the plate member and the support member to each other, wherein the plate member is free from connection to the support member by means of the first elastic member at corners of the plate member.

Thus, in the above-mentioned liquid crystal apparatus, the plate member supporting the liquid crystal panel, preferably in a frame-shape, is attached on its sides except for its corners to the frame-shaped support member. When the liquid crystal apparatus is supplied with an impact, e.g., by dropping, the plastic member is urged to move together with the liquid crystal panel. As the corners of the plate member are not connected to the support member, the plate member is caused to move while deforming the elastic member only with its side portions, so that the plate member and the liquid crystal panel are moved in a state close to parallel and with a suppressed degree of warping.

These and other objects, features and advantages of the present invention will become more apparent upon consideration of the following description of the preferred embodiments of the present invention taken in conjunction with the accompanying drawings, wherein like parts are denoted by like reference numerals.

DESCRIPTION OF THE PREFERRED EMBODIMENTS

A first embodiment of the present invention is described with reference to FIG. 5.

Figure 5:
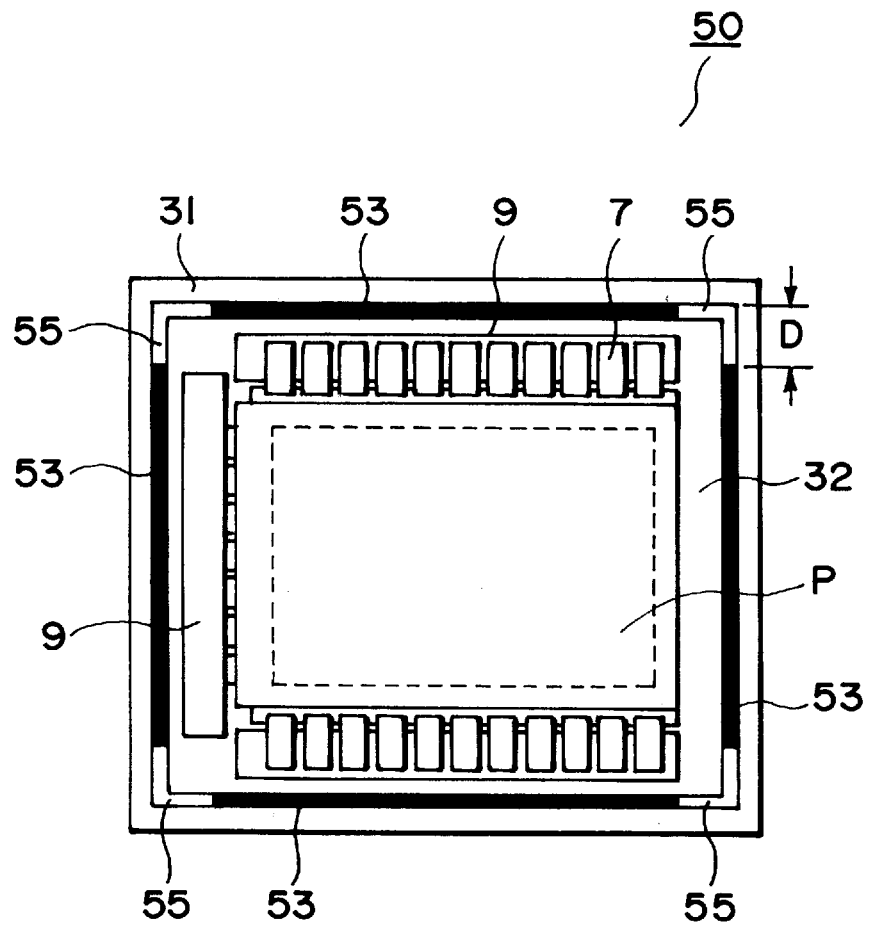
FIG. 5 is a plan view for illustrating characteristic structural features of a liquid crystal display apparatus according to the invention.

A liquid crystal display apparatus 50 shown in FIG. 5 according to this embodiment has a similar structure as the liquid crystal display apparatus 30 with respect to a liquid crystal panel P, a fixing plate 32 as a plate member to which the panel P is affixed and a fixed supporting member 31 as a support member. Particularly, the sectional structure thereof in the panel center region thereof is identical to that shown in FIG. 2. However, the apparatus 50 shown in FIG. 5 is characteristic with respect to the structure of an elastic member (first elastic member) 53 disposed between the elastic member and the fixed supporting member supporting the fixing plate.

Figure 2:
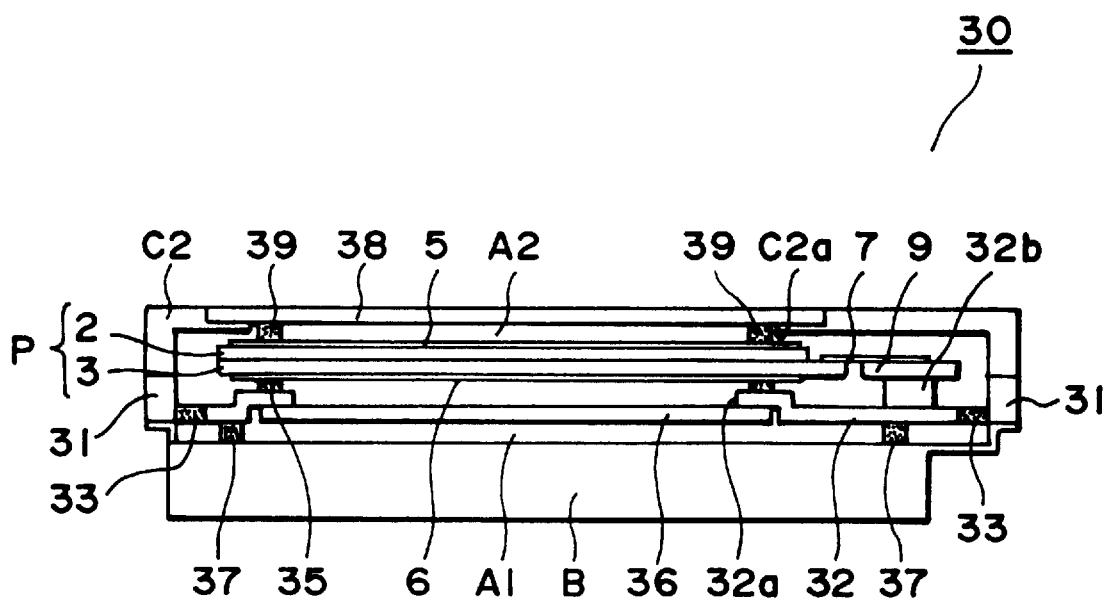
FIG. 2 is a sectional view of another example of a liquid crystal display apparatus.
Figure 3:
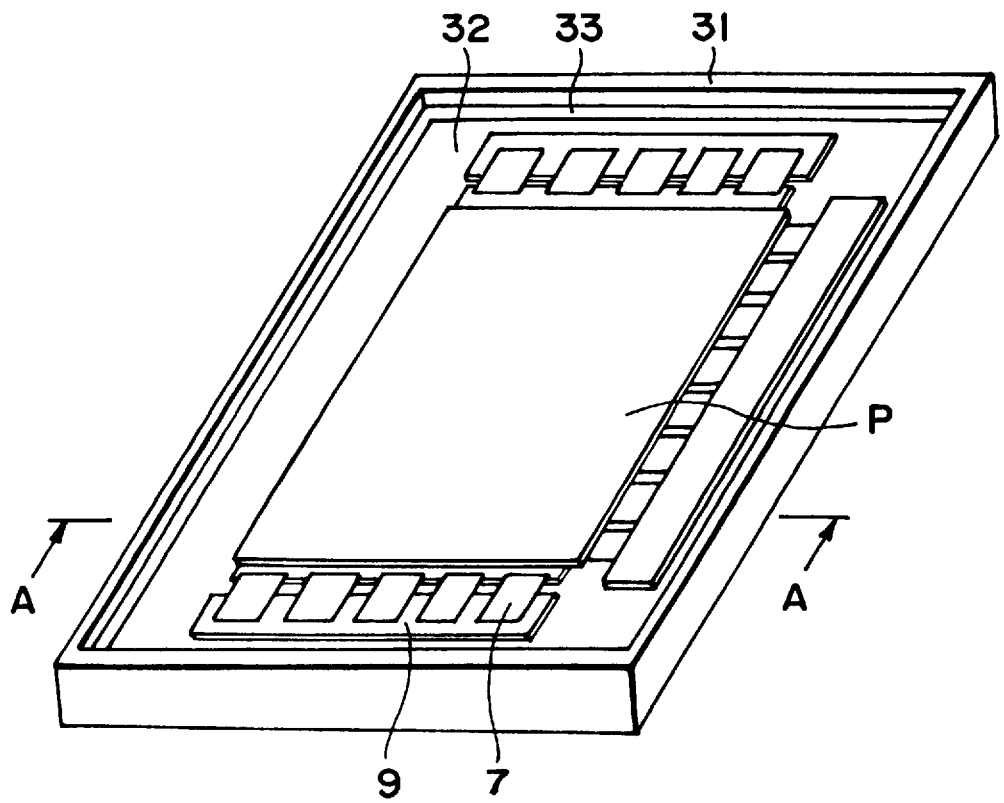
FIG. 3 is a perspective view for illustrating a liquid crystal panel-supporting structure in the apparatus of FIG. 2.
Figure 4A:
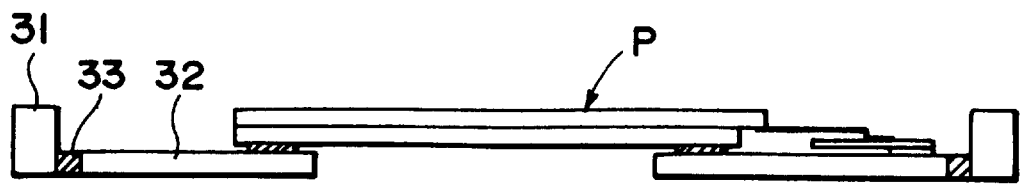
FIGS. 4A and 4B are schematic sectional views for illustrating an ordinary state and a state under impact application, respectively, of the panel-supporting structure shown in FIG. 3.
Figure 4B:
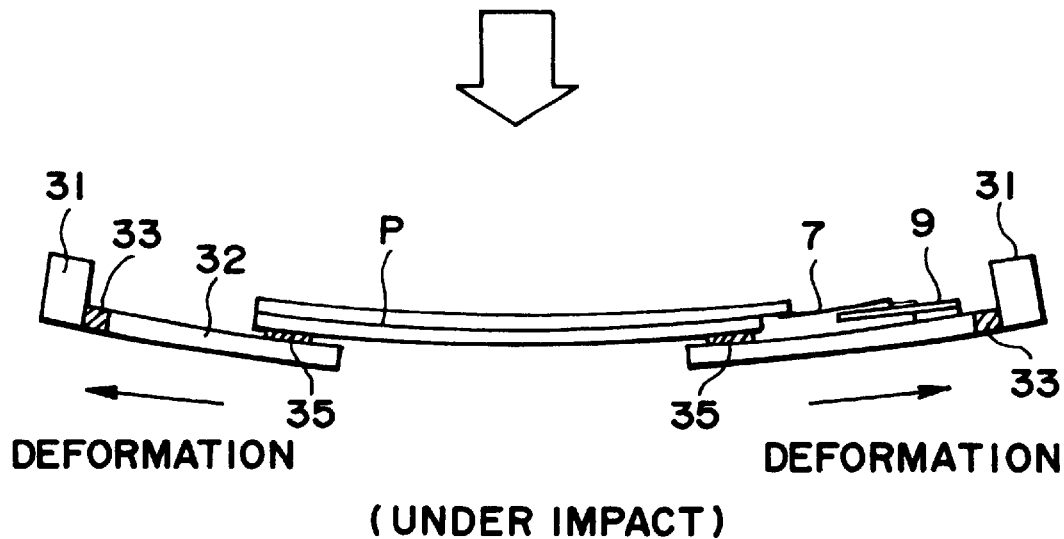

Referring to FIG. 5, the liquid crystal display apparatus (as a liquid crystal apparatus) 50 according to this embodiment includes a fixed supporting member (support member) 31 and a fixing plate (plastic member) 32 having structures shown in FIGS. 2 and 3. More specifically, the fixing plate 32, to which a liquid crystal panel P is affixed, is provided with an aperture 32a, and the fixed supporting member 31 is disposed with a prescribed gap of, e.g., ca. 3–6 mm, from the fixing plate 32 so as to surround the fixing plate 32.

At the gap between the fixed supporting member 31 and the fixing plate 32, an elastic member (first elastic member) 53 is disposed, so that the fixed supporting member 31 supports the fixing plate 32 via the elastic member 53. The elastic member 53 connects the fixed supporting member 31 and the fixing plate 32 to each other in a manner of attenuating a vibration exerted from the fixed supporting member 31. Unlike the one shown in FIG. 2, the elastic member 53 is not disposed at four corners 55 of the fixing plate 32, so that the four corner portions 55 (which may be referred to hereinafter as non-bonded portions 55) of the fixing plate 32 are not bonded to the support member 31.

The elastic member 53 may be composed of a desired elastic material, e.g., an elastomeric material, such as silicone rubber. For example, a curable elastic material may be disposed in a prescribed pattern or by solution application at the gap between the fixed supporting member 31 and the fixing plate 32, followed by curing at an elevated temperature or room temperature.

In addition to silicone elastomer, it is also possible to use other thermoplastic elastomers, such as polyolefin elastomers. These elastomers, after curing, may preferably have an elastomer hardness (JIS-A) of 10–90, more preferably 20–60.

The non-bonded portions 55 may have a length D which may be determined depending on the size and the weight of the liquid crystal panel P. The lengths D of the non-bonded portions need not be identical for all the four corners but can be different from each other, e.g., in case where a picture display area is formed in a region deviated from the central region of the liquid crystal panel P.

For example, in the case of supporting a liquid crystal panel of ca. 15 inches in a diagonal side and ca. 500 g in weight by using a fixed supporting member of ca. 200–300 mg in weight, the elastic member 53 on each side may be disposed in a thickness of at most ca. 3 mm and a width of ca. 3–6 mm so as to leave a non-bonded portion length D of ca. 10–100 mm. As mentioned above, these values can vary depending on the size and the weight of the panel P, and the material of the elastic member 53.

Similarly as the sectional structure shown in FIG. 2, the liquid crystal display apparatus 50 may be provided with a cover (housing member) C2 disposed to cover the liquid crystal panel P, and a cushioning member (second elastic member) 39 may be disposed between the cover C2 and the liquid crystal panel P. The cushioning member 39 may be composed of a hard elastomeric material, such as rubber. The liquid crystal panel P, the cover C2 and the cushioning member 39, in combination, define an almost closed space A2 capable of exhibiting an air damper effect.

The liquid crystal panel P may be affixed to the upper surface of the fixing plate 32 via an adhesive (as a third elastic member) 35 so as to close an aperture 32a thereof, and a diffusion plate (diffusion means) 36 may also be attached to a lower surface of the fixing plate 32 so as to close the aperture 32a. The adhesive may also preferably comprise a material exhibiting an elastomeric property even after its curing.

Figure 1:
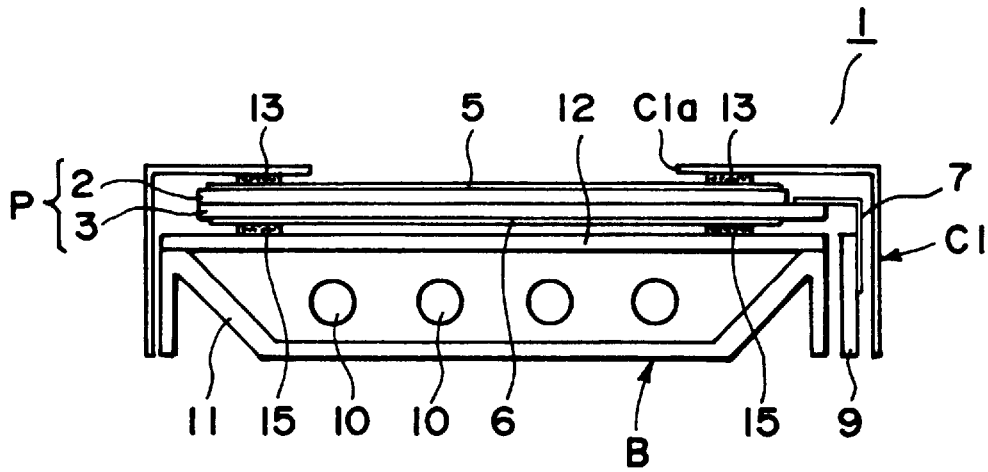
FIG. 1 is a sectional view of an example of a liquid crystal display apparatus.

Below the diffusion plate 36, a backlight device (as a light source) B may be disposed. An almost closed space A1 capable of exhibiting an air-damper effect may be formed by the backlight device B, the diffusion plate 36 for diffusing light issued from the backlight device B to provide planer diffused light for illuminating the liquid crystal panel P and the fixing plate 32. In this embodiment, the backlight device B may be provided with one or more light sources on one or more sides (or edges) thereof, but the backlight device B can also have a structure as shown in FIG. 1 including a plurality of lamps 10 enclosed within a space below the panel P sandwiched between a reflection plate 11 on a back side and a diffusion plate 12 on a front side facing the liquid crystal panel P.

Similarly as the one shown in FIG. 2, the liquid crystal display apparatus 50 may be provided with a protective plate 38 of, e.g., a rigid glass plate, in front of the liquid crystal panel P. As mentioned above, an almost closed space A2 may be defined by the protective plate 38, the liquid crystal panel P and a cushioning member 39 disposed between the protective plate 38 and the liquid crystal panel P.

The embodiment of liquid crystal display apparatus described above may exhibit functions and effects as described below.

According to the liquid crystal display apparatus 50 of this embodiment, the non-bonded portions (four corner portions) of the fixing plate 32 are not connected to the fixing plate 31. Accordingly, when the liquid crystal display apparatus 50 is supplied with an impact due to dropping, etc., the fixing plate 32 and the liquid crystal panel P are rather free from a constriction force exerted from the corners liable to cause a bowl-shaped warping but are allowed to move substantially in parallel, whereby the liquid crystal alignment deterioration in the panel can be alleviated.

Further, an almost closed space A2 is formed above the liquid crystal panel P by the cover C2, the protective plate 38 and the cushioning member 3, and an almost closed space A1 is formed below the liquid crystal panel P by the backlight device B, the diffusion plate 36 and the fixing plate 32. Accordingly, when the liquid crystal display apparatus 50 is supplied with an impact, the spaces A1 and A2 function as air dampers to alleviate the impact applied to the liquid crystal panel P.

Particularly, in this embodiment, the liquid crystal panel P moves while retaining its planar shape so that the volume change in the spaces A1 and A2 becomes larger than in the case of a bowl-shaped deformation of the liquid crystal panel. Accordingly, the spaces A1 and A2 can exhibit a larger air damper effect, to provide an enhanced impact alleviation effect.

Incidentally, in case where the protective plate 38 is composed of a material of a low rigidity, when the liquid crystal panel P is moved to the protective plate 38 under application of an external impact, the protective plate 38 can also be deformed to reduce a volume change in the almost closed space A2, thus being liable to provide a lower air damper effect. However, this difficulty may be alleviated in this embodiment by composing the protective plate 38 of a rigid glass plate, to exhibit an enhanced air damper effect.

The liquid crystal material used in the liquid crystal panel of the present invention may comprise various types of liquid crystal materials, inclusive of a nematic liquid crystal. However, the liquid crystal apparatus of the present invention exhibiting a particularly excellent impact-alleviating effect to the liquid crystal panel may be most suitably applied to a liquid crystal panel containing a chiral smectic liquid crystal rather vulnerable to external impact and liable to result in alignment defects, such as ferroelectric liquid crystal and anti-ferroelectric liquid crystal.

As described above, when supplied with an external impact as by dropping, the liquid crystal apparatus according to the present invention allows a parallel movement of the liquid crystal panel and the plate member fixing the panel while obviating warping, whereby the liquid crystal panel is prevented from causing a bowl-shaped deformation liable to cause alignment defects of the liquid crystal therein.

What is claimed is:

1. A liquid crystal apparatus, comprising:
    a rectangular plate member,
    a liquid crystal panel supported by the plate member,
    a frame-shaped support member disposed with a prescribed gap from and so as to surround the plate member, and
    a first elastic member disposed at the prescribed gap to connect the plate member and the support member to each other,
    wherein the plate member is free from connection to the support member by means of the first elastic member at corners of the plate member.

2. A liquid crystal apparatus according to claim 1, further including a housing member disposed to cover the liquid crystal panel, and a second elastic member disposed between the housing member and the liquid crystal panel so as to define an almost closed space by the liquid crystal panel, the housing member and the second elastic member.

3. A liquid crystal apparatus according to claim 1, wherein the liquid crystal panel is affixed to the plate member via a third elastic member.

4. A liquid crystal apparatus according to claim 1, wherein the plate member is provided with an aperture, and the liquid crystal panel is disposed so as to close the aperture.

5. A liquid crystal apparatus according to claim 1, wherein the liquid crystal panel comprises a pair of substrates disposed substantially parallel to each other and a liquid crystal disposed between the substrates.

6. A liquid crystal apparatus according to claim 5, wherein said liquid crystal is a ferroelectric liquid crystal.

7. A liquid crystal apparatus according to claim 1, wherein a light source is disposed on a back side of the liquid crystal panel.

8. A liquid crystal apparatus according to claim 7, wherein the light source comprises a fluorescent lamp and a light guide member for guiding from light from the fluorescent lamp toward the liquid crystal panel.

9. A liquid crystal apparatus according to claim 8, wherein a diffusion means is disposed between the light source and the liquid crystal panel so as to diffuse light from the light source to form planar light for illuminating the liquid crystal panel.

10. A liquid crystal apparatus according to claim 9, wherein said plate member is provided with an aperture, and the diffusion means is disposed so as to close the aperture and define an almost closed space together with the plate member and the light source.

11. A liquid crystal apparatus according to claim 7, wherein said light source comprises a plurality of lamps held within a space baked by a reflection plate.

12. A liquid crystal apparatus according to claim 7, wherein a diffusion plate is disposed between the light source and the liquid crystal panel.

* * * * *

UNITED STATES PATENT AND TRADEMARK OFFICE
CERTIFICATE OF CORRECTION

PATENT NO. : 5,838,401
DATED : November 17, 1998
INVENTOR(S) : Uehara

It is certified that error appears in the above-identified patent and that said Letters Patent is hereby corrected as shown below:

Title page;
[56] REFERENCES CITED:

U.S. PATENT DOCUMENTS, "Takahasi" should read --Takahashi--.

COLUMN 7:

Line 1, "from" (first occurrence) should be deleted.

Signed and Sealed this

Sixteenth Day of November, 1999

Attest:

Q. TODD DICKINSON

*Attesting Officer*  *Acting Commissioner of Patents and Trademarks*